United States Patent
Palmer

(10) Patent No.: US 11,836,074 B2
(45) Date of Patent: Dec. 5, 2023

(54) MULTIPLE FLASH TRANSLATION LAYERS AT A MEMORY DEVICE

(71) Applicant: Micron Technology, Inc., Boise, ID (US)

(72) Inventor: David A. Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 63 days.

(21) Appl. No.: 17/065,455

(22) Filed: Oct. 7, 2020

(65) Prior Publication Data

US 2022/0107886 A1  Apr. 7, 2022

(51) Int. Cl.
G06F 12/02 (2006.01)
G06F 12/0873 (2016.01)
G06F 11/30 (2006.01)
G06F 12/1018 (2016.01)

(52) U.S. Cl.
CPC ...... *G06F 12/0246* (2013.01); *G06F 11/3037* (2013.01); *G06F 12/0873* (2013.01); *G06F 12/1018* (2013.01); *G06F 2212/7201* (2013.01)

(58) Field of Classification Search
CPC .............. G06F 12/0246; G06F 12/0873; G06F 12/1018; G06F 11/3037; G06F 2212/7201
See application file for complete search history.

(56) References Cited

U.S. PATENT DOCUMENTS

| | | | |
|---|---|---|---|
| 9,507,711 B1* | 11/2016 | Kotte | G06F 12/0246 |
| 10,222,984 B1* | 3/2019 | O'Brien, III | G06F 3/0644 |
| 10,877,900 B1* | 12/2020 | Muthiah | G06F 9/4411 |
| 2012/0124276 A1* | 5/2012 | Ahn | G06F 12/0246 |
| | | | 711/E12.008 |
| 2012/0317377 A1* | 12/2012 | Palay | G06F 12/0246 |
| | | | 711/E12.001 |
| 2017/0269852 A1* | 9/2017 | Lin | G06F 11/1044 |
| 2021/0173785 A1* | 6/2021 | Jin | G06F 12/0246 |
| 2022/0030286 A1* | 1/2022 | Muthiah | H04N 21/8133 |
| 2022/0129189 A1* | 4/2022 | Zhou | G06F 3/0679 |

* cited by examiner

*Primary Examiner* — Nanci N Wong
(74) *Attorney, Agent, or Firm* — Holland & Hart LLP

(57) ABSTRACT

Methods, systems, and devices for multiple flash translation layers (FTLs) at a memory device are described to support two or more FTLs within a memory device. A first FTL may be configured to support data mapping using a defined granularity and a second FTL may be configured to support data mapping using a smaller granularity than the defined granularity or data that does not match the defined granularity, based on one or more characteristics of the data. A memory device may select between the FTLs to map data based on the one or more characteristics of the data and may write the data to the memory device. The memory device may store logical-to-physical mapping associated with the data, among other information, using the selected FTL.

18 Claims, 6 Drawing Sheets

MULTIPLE FLASH TRANSLATION LAYERS AT A MEMORY DEVICE

BACKGROUND

The following relates generally to one or more memory systems and more specifically to multiple flash translation layers (FTLs) at a memory device.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
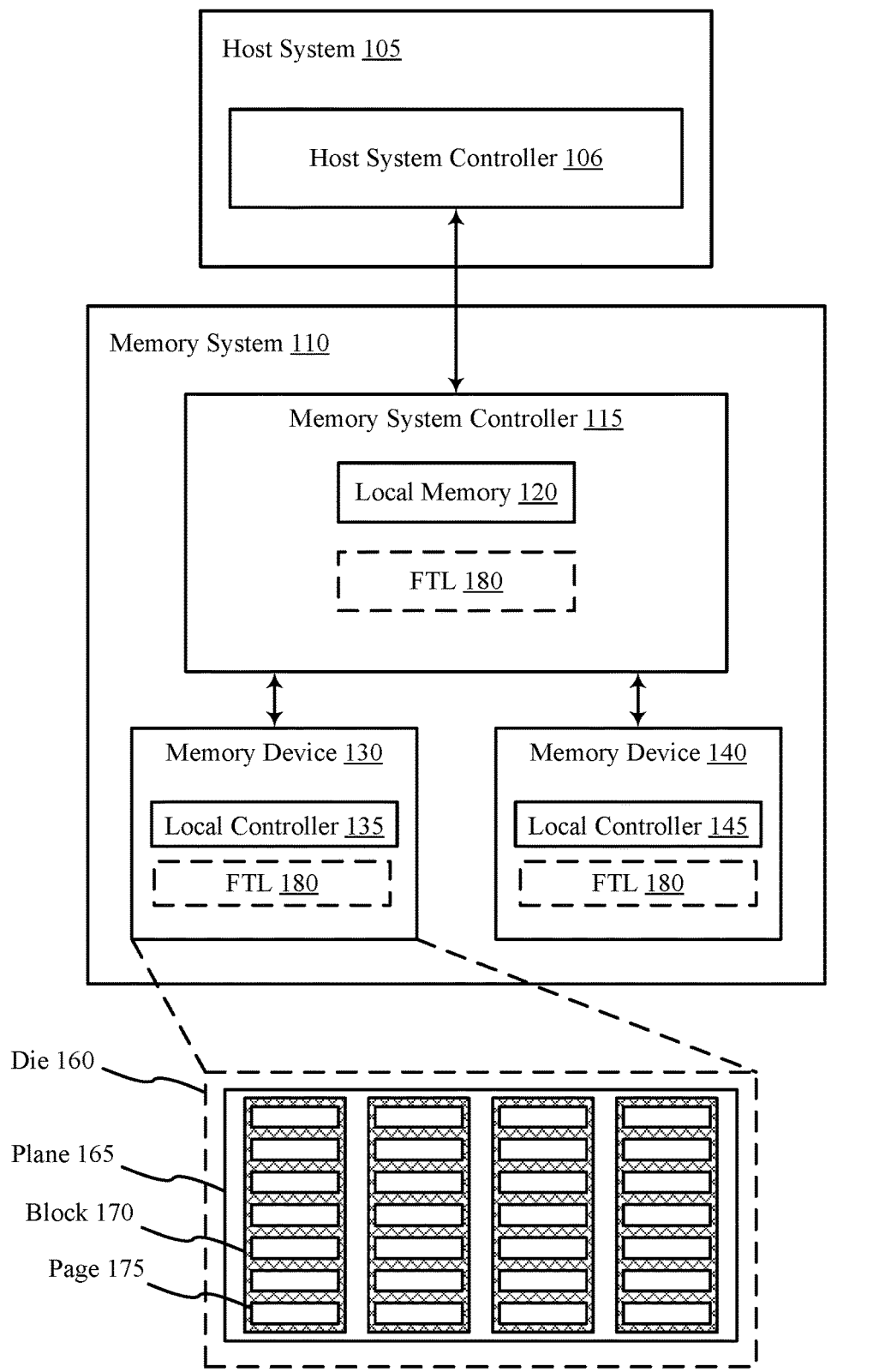
FIG. 1 illustrates an example of a system that supports multiple flash translation layers (FTLs) at a memory device in accordance with examples as disclosed herein.

A memory device may include a flash translation layer (FTL), which may support data storage and management, among other things. An FTL may, for example, perform logical to physical (L2P) address mapping, garbage collection, wear-leveling, error correction code (ECC) procedures, or bad block management, or other operations, or any combination thereof. In some cases, an FTL may support data mapping (e.g., L2P mapping) using a defined granularity. The defined granularity may support increased efficiency in space and time when managing L2P mapping, for example, such that data matching the defined granularity may be written and read with increased speed and accuracy. In some cases, data to be written to the memory device may be associated with a smaller granularity than the defined granularity. For example, the data may be smaller than the defined granularity, or may be aligned such that a portion of the data is smaller than the defined granularity, or may fail to match a physical granularity of one or more free physical addresses for storing the data. In these and other cases, the memory device may perform read, modify, and write operations to write the data because the granularity associated with the data may fail to match the defined granularity. The read, modify, and write operations may introduce additional latency to read, modify, or write the data and may also increase write amplification and wear, which may decrease device lifetime and device performance, among other disadvantages.

The present disclosure provides techniques for including and using two or more FTLs within a memory device, where a first FTL (e.g., a primary FTL using a larger granularity) may be configured to support data mapping using the defined granularity and a second FTL (e.g., a secondary FTL or a smaller FTL) may be configured to support data mapping using a smaller granularity than the defined granularity. The first FTL may be used, for example, for mapping data that matches the defined granularity, which may represent a majority of the data stored at the memory device. The second FTL may be used for mapping other data that does not match the defined granularity. For example, if a size of data is smaller than the defined granularity, or if an alignment of one or more subsets of data fails to match a data alignment for the first FTL, or if a size or alignment of data fails to match a size or alignment of free physical locations (e.g., associated with the first FTL), the memory device may select the second FTL for managing the data mapping (alone or in tandem with the first FTL). Accordingly, the memory device may select between the FTLs to map data, for example, based on one or more characteristics of the data. Selecting between the FTLs may support higher L2P efficiency, higher cache hit rates, and reduced memory block budgets for data that matches the defined granularity, while decreasing latency and wear associated with writing data that fails to match the defined granularity (e.g., by eliminating or reducing the read, modify, and write operations associated with using one FTL).

Features of the disclosure are initially described in the context of a system as described with reference to FIG. 1. Features of the disclosure are described in the context a device architecture, a flow diagram, and a mapping scheme as described with reference to FIGS. 2-4. These and other features of the disclosure are further illustrated by and described with reference to an apparatus diagram and flowcharts that relate to multiple FTLs at a memory device as described with reference to FIGS. 5 and 6.

FIG. 1 is an example of a system 100 that supports multiple FTLs at a memory device in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, serial advanced technology attachment (SATA) controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be rewritten with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be preferable to erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or memory system controller 115.

The L2P mapping table, among other information, may be managed by or included in an FTL 180, where an FTL 180 may, for example, perform L2P address mapping, garbage collection, wear-leveling, ECC procedures, and/or bad block management, among other examples. The FTL 180 may be included in portions of a controller, such as memory system controller 115 or local controller 135, or may additionally or alternatively be included in a memory device 130 as separate logic or firmware.

Two or more FTLs 180 may be included as part of a memory device 130 or memory system 110, where a first FTL 180 (e.g., a primary FTL 180 using a larger granularity) may be configured to support data mapping using a defined granularity and a second FTL 180 (e.g., a secondary or smaller FTL 180) may be configured to support data mapping using a smaller granularity than the defined granularity. For example, if a size of data is smaller than the defined granularity, or if an alignment of one or more subsets of data fails to match a data alignment for the first FTL 180, or if a size or alignment of data fails to match a size or alignment of free physical locations (e.g., associated with the first FTL 180), the memory device may select the second FTL 180 for managing the data mapping. Selecting between the FTL 180s may support higher L2P efficiency, higher cache hit rates, and reduced memory block budgets for data that matches the defined granularity, while decreasing latency and wear associated with writing data that fails to match the defined granularity (e.g., by eliminating or reducing the read, modify, and write operations associated with using one FTL 180).

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support multiple FTLs at a memory device. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform one or more associated functions as described herein.

Figure 2:
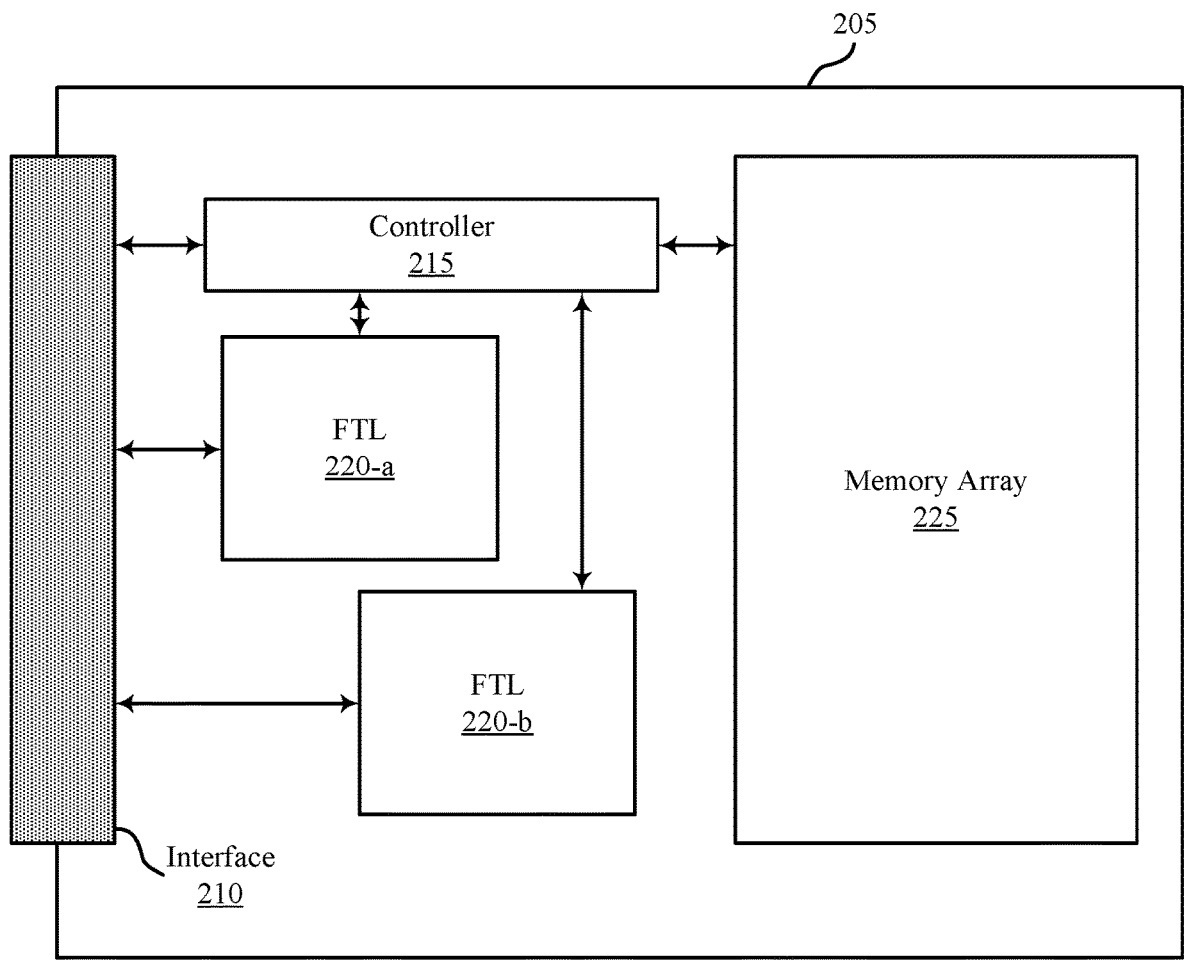
FIG. 2 illustrates an example of an architecture that supports multiple FTLs at a memory device in accordance with examples as disclosed herein.

FIG. 2 illustrates an example of an architecture 200 that supports multiple FTLs at a memory device in accordance with examples as disclosed herein. Architecture 200 may represent a device architecture 200 or a system architecture 200, for example, with reference to a respective memory device or memory system as described with reference to FIG. 1. For example, architecture 200 may be implemented at a memory device 205, which may represent an example of a memory device 130 as described with reference to FIG. 1. While the examples described herein reference a memory device 205, it is to be understood that the same examples may apply to a memory system without departing from the scope of the present disclosure.

The memory device 205 may include an interface 210 (e.g., one or more pins, balls, or pads), which may be coupled with or couplable with a host system, a host device, or another source external to the memory device 205. The memory device 205 may communicate with the host system or the host device (e.g., or other external source) via the interface 210, for example, by receiving data and one or more commands from the host system or the host device, as well as transmitting data (e.g., in response to a read command) to the host system or the host device, via the interface 210. In one example, the memory device 205 may receive a write command from a host system or a host device, along with data to be written to the memory device 205. The memory device 205 may employ one or more techniques described herein to support writing the received data to the memory device 205 (e.g., to a memory array 225 of the memory device 205).

As described with reference to FIG. 1, a memory device 205 may include an FTL 220, which may support data storage and management. An FTL 220 may be coupled with the interface and may additionally be coupled with or included in a device controller 215. For example, an FTL 220 may represent any combination of controller logic or software, or logic or software that is separate from the controller 215.

When the memory device 205 receives the data and the command to write the data (e.g., which may include a logical address of the data), an FTL 220 may determine a physical address (e.g., a free physical address) at which to store the data (e.g., within the memory array 225) and may store or update an L2P mapping that relates the logical address and physical address of the data. A size of the data may be referred to as a block write or block write size, and may represent a quantity of bits of data to be written to the memory device 205 (e.g., to the memory array 225). Physical addresses and logical addresses as described herein may also respectively represent a physical block address (PBA) and a logical block address (LBA).

In some cases, an FTL 220 (e.g., an FTL 220-a) may support data mapping (e.g., L2P mapping) using a defined granularity (e.g., a granularity of a page of data or of 32 kilobytes (kB) of data), which may be referred to as an FTL translation unit. The defined granularity may support increased efficiency in space and time when managing L2P mapping (e.g., an L2P table), for example, by mapping physical addresses using a size of a physical page of data (e.g., 16 kB of data or four LBAs) or in multiples of a physical page of data (e.g., 64 kB or larger), such as in multiplane physical page chunks. Mapping information may be stored in a list of logical addresses and associated physical addresses that may be configured for larger and faster data storage. For example, one physical address may be associated with four logical addresses (e.g., the FTL translation unit), such that data matching the defined granularity may be written and read with increased speed and accuracy. In some cases, a host system or a host device may indicate data for writing to the memory device 205 that is associated with a smaller granularity than the defined granularity. For example, the data may be smaller than the defined granularity, may be aligned such that a portion of the data is smaller than the defined granularity, or may fail to match a physical granularity of one or more free physical addresses even if the size or another characteristic would be appropriately handled by the FTL 220.

In these and other cases, the memory device 205 (e.g., FTL 220-a of the memory device 205) may perform read, modify, and write operations to write the data (e.g., to include other, previously-written data in the write operation) because the granularity associated with the data may fail to match the defined granularity. The read, modify, and write operations using these other different techniques, however, may introduce additional latency to writing the data and may also increase write amplification and wear, which may decrease device lifetime and device performance.

The present disclosure provides techniques for including two or more FTLs 220 within a memory device, where a first FTL 220-a (e.g., a primary FTL 220 using a larger granularity) may be configured to support data mapping using the defined granularity and a second FTL 220-b (e.g., a secondary or smaller FTL 220) may be configured to support data mapping using a smaller granularity (e.g., 4 kB or less) than the defined granularity. FTL 220-a may be used, for example, for mapping data that matches the defined granularity, which may represent a majority of the data stored at the memory device 205. For example, the data may represent relatively high sequential data or workloads, which may represent a relatively higher quantity of larger blocks of data with a relatively lower quantity of smaller blocks of data. FTL 220-b may be used for mapping data that does not match the defined granularity (e.g., that is associated with a smaller granularity).

Using FTL 220-b for mapping data that does not match the defined granularity may support mapping of such data without performing the read, modify, and write operations associated with FTL 220-a. For example, FTL 220-b may be configured to map data that may be smaller than the defined granularity, data that may be aligned such that a portion of the data is smaller than the defined granularity, or data that may fail to match a physical granularity of one or more free physical addresses without performing a read, modify, and write operation. Doing so may decrease latency, decrease write amplification and wear, and increase device lifetime and performance, for example, by reducing the read, modify, and write operations associated with mapping the data using FTL 220-a.

Accordingly, the memory device 205 may select between FTL 220-a and 220-b to map data (alone or in some combination), for example, based on one or more characteristics of the data. Selecting between FTL 220-a and 220-b for managing data may support higher L2P efficiency, higher cache hit rates, and reduced memory block budgets for data that matches the defined granularity, while decreasing latency and wear associated with writing data that fails to match the defined granularity (e.g., by eliminating or reducing the read, modify, and write operations associated with using FTL 220-a). In some cases, the memory device 205 may select one of FTL 220-a or 220-b to map data, for example, based on one or more characteristics of the data matching FTL 220-a or 220-b, respectively. In some cases, the memory device 205 may select both FTL 220-a and FTL 220-b for mapping data. For example, a first portion or subset of the data may not match the defined granularity (e.g., based on the one or more characteristics of the first portion of the data) and may be mapped using FTL 220-b, while a second portion or subset of the data match the defined granularity (e.g., based on the one or more characteristics of the second portion of the data) and may be mapped using FTL 220-a.

FTL 220-b may be configured to manage data mapping (e.g., L2P mapping) at a smaller granularity than FTL 220-a. For example, if a size of data is smaller than the defined granularity, if an alignment of one or more subsets of data fails to match a data alignment for FTL 220-a, or if a size or alignment of data fails to match a size or alignment of free physical locations (e.g., associated with FTL 220-a), the memory device 205 may select FTL 220-b for managing the data mapping. Details regarding selecting between FTL 220-a and FTL 220-b are further described with reference to FIG. 3. FTL 220-b may be with physical locations for storing data mapped by FTL 220-b, where the physical locations may represent a temporary storage location for the data. The physical locations may represent one or more memory cells blocks (e.g., an SLC block or virtual block across all planes or dies) configured for data mapped by FTL 220-b. Data written to the physical locations may be later combined into larger data that may be managed by FTL 220-a, such as via a read, modify, and write procedure, via sequential garbage collection, or data aggregation. Combining the data into larger data may increase the data efficiency and FTL efficiency by managing the data using FTL 220-a.

FTL 220-b may be configured to manage data mapping (e.g., an L2P mapping) using one or more mapping schemes, which may be configured with a format corresponding to FTL 220-b. For example, FTL 220-b may manage the data mapping (e.g., may store L2P information) using any data structure, such as a binary or other tree, a hash table of physical and logical addresses, a flat list of pairs of logical and physical address, or any combination thereof. Examples related to a binary tree mapping scheme are further described herein with reference to FIG. 4. FTL 220-*b* may store the data mapping in a portion of the memory device 205, for example, using SRAM included in the memory device or associated with the memory array 225 (e.g., up to 256 kB of SRAM).

If FTL 220-*b* is used to configure data for writing to the memory device 205, FTL 220-*b* may identify one or more logical addresses provided by the host system or the host device (e.g., via a write command) for the data. FTL 220-*b* may identify one or more physical addresses corresponding to the one or more logical addresses for storing the data and may update a data mapping scheme to associated the one or more logical addresses with the one or more respective physical addresses. The memory device 205 (e.g., using a controller 215) may write the data to the one or more physical addresses.

If the memory device 205 receives, for example, a read command to read data, FTL 220-*b* may identify (e.g., from the read command) one or more logical addresses associated with the data. FTL 220-*b* may look up the one or more logical addresses using the data mapping (e.g., L2P table) and, if the data is associated with FTL 220-*b*, FTL 220-*b* may return one or more physical addresses corresponding to the one or more logical addresses (e.g., to the controller 215). If the data is not associated with FTL 220-*b*, FTL 220-*b* may return an indication that the data is not associated with the data mapping for FTL 220-*b* (e.g., to the controller 215), and memory device 205 (e.g., the controller 215) may use FTL 220-*a* to look up and read the data (e.g., using a lookup mechanism associated with the primary L2P table).

As described herein, some or all of the data stored using information associated with FTL 220-*b* may be rewritten to be associated with FTL 220-*a*. For example, a flush may represent part of a garbage collection operation (e.g., associated with FTL 220-*a*) during which all of the data associated with FTL 220-*b* may be rewritten to be associated with FTL 220-*a*. A flush may occur when powering down the memory device 205, when a threshold quantity of entries is reached for FTL 220-*b*, when a timer expires, or any combination thereof. Other rewriting techniques for the data associated with FTL 220-*b* may include rewriting a portion (e.g., but not all) of the data associated with FTL 220-*b*. For example, data associated with one or more logical or physical addresses may be identified by the memory device 205 (e.g., by the controller 215) for a rewrite process and may be rewritten from being associated with FTL 220-*b* to being associated with FTL 220-*a*.

Figure 3:
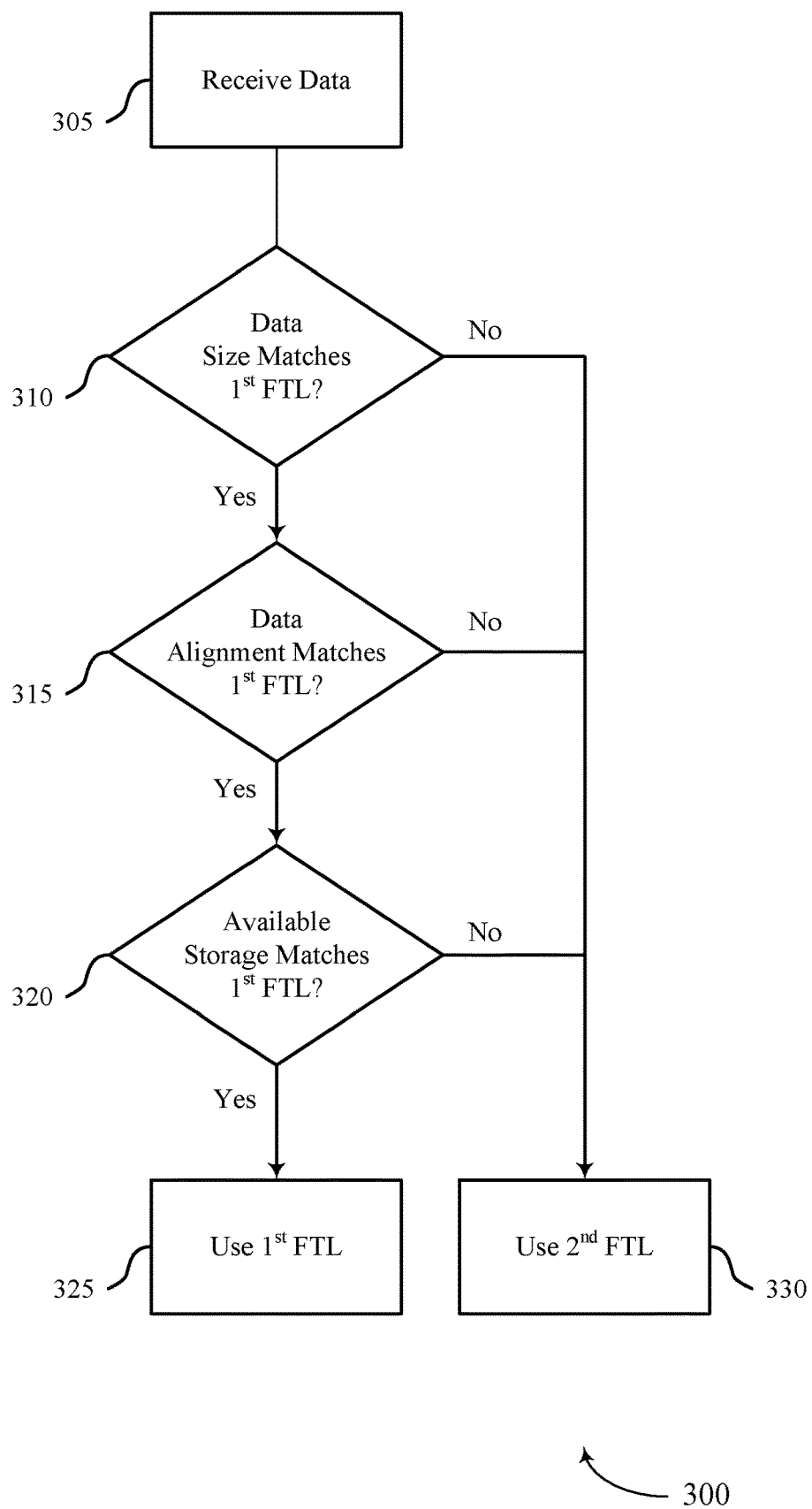
FIG. 3 illustrates an example of a flow diagram that supports multiple FTLs at a memory device in accordance with examples as disclosed herein.

FIG. 3 illustrates an example of a flow diagram 300 that supports using multiple FTLs at a memory device in accordance with examples as disclosed herein. Flow diagram 300 may illustrate techniques for a memory device to select between a first FTL and a second FTL to map data, for example, as described herein with respect to FIG. 2. The memory device may represent an example of a memory device described with reference to FIGS. 1 and 2. The first FTL may represent an example of an FTL configured to map data associated with or having a defined granularity, and the second FTL may represent an example of an FTL configured to map data associated with or having a granularity smaller than the defined granularity. Flow diagram 300 may illustrate techniques that take place at a controller or other component of a memory device (or some combination thereof), which may take place, for example, in response to receiving a command, such as a write command, and associated data from a host system or a host device (e.g., or other source external to the memory device).

At 305, data may be received (e.g., at a controller or an interface) for writing to the memory device. The data may be received within or in relation to a write command from a source external to the memory device, such as a host system or a host device. The memory device may identify one or more logical addresses for the data, where a size of the data may be based on a quantity of logical addresses for the data and where the logical addresses may be configured with a data alignment or configuration. The memory device may evaluate the data to determine one or more characteristics of the data and to determine whether the one or more characteristics of the data match the first FTL or the second FTL.

At 310, it may be determined (e.g., by a controller of the memory device) whether the data size matches a threshold data size for the first FTL. The threshold may, for example, represent a size of an FTL translation unit for the first FTL or may represent the defined granularity for the first FTL. If the data size is greater than or equal to the threshold, the memory device may proceed to 315, for example, because the data may match data mapping techniques for the first FTL based on the size of the data. If the data size is less than the threshold, the memory device may proceed to 330 and may use the second FTL for processing and storing the data, for example, because the data may match data mapping techniques for the second FTL based on the size of the data (e.g., because the second FTL may be configured for smaller sized data).

At 315, it may be determined (e.g., by a controller of the memory device) whether an alignment of the data matches a data alignment for the first FTL. The data may, for example, include a quantity of logical addresses (e.g., LBAs), where the alignment of the logical addresses may or may not match the data alignment (e.g., including the defined granularity) for the first FTL. For example, the first FTL may be configured to process data using the defined granularity, or a multiple of the defined granularity. Accordingly, if the data includes logical addresses greater than the defined granularity but that are not a multiple of the defined granularity, the data alignment (e.g., at least for a portion of the data) may not match an alignment for the first FTL. For example, the defined granularity may represent four logical addresses (e.g., four LBAs) and the data may include six logical addresses (e.g., six LBAs), such that four of the logical addresses of the data may match the data alignment of the first FTL but the remaining two logical addresses of the data may not.

Additionally or alternatively, the data may be configured in groups (e.g., chunks) of data for processing at an FTL, and a size of one of the chunks of data may not match the defined granularity. For example, the defined granularity may represent four logical addresses (e.g., four LBAs) and the data may be configured in a first chunk that includes two logical addresses (e.g., two LBAs), a second chunk that includes four logical addresses (e.g., four LBAs), and a third chunk that includes two logical addresses (e.g., two LBAs). The data may be a multiple of the defined granularity (e.g., eight logical addresses may be a multiple of four logical addresses), but two of the chunks of data may be less than the defined granularity (e.g., the first and the third chunks) and may not match the data alignment of the first FTL.

In these and other examples, if the alignment of the data matches the data alignment of the first FTL, the memory device may proceed to 320, for example, because the data may match data mapping techniques for the first FTL based on the alignment of the data. Similarly, if the alignment of the data does not match the data alignment of the first FTL, the memory device may proceed to 330 and may use the second FTL for storing the data (e.g., or a non-aligned subset of the data), for example, because the data (e.g., or the non-aligned portion thereof) may match data mapping techniques for the second FTL based on the alignment of the data (e.g., because the second FTL may be configured for data aligned with a smaller granularity).

At 320, it may be determined (e.g., by a controller of the memory device) whether available storage for the data (e.g., free physical addresses or PBAs) matches a data alignment or size for the first FTL. As described herein, the data may include a quantity of logical addresses (e.g., LBAs), where the alignment or size of one or more of the logical addresses may or may not match the available storage for the data associated with the first FTL.

For example, the first FTL may be associated with data storage at defined physical addresses of an array of the memory device. The physical addresses may include pages of data within a plane of data, where multiple (e.g., two) planes of data may be included in a memory die and where multiple memory dies may be included in the memory device. The memory device may be configured to store data using a write procedure that writes data to one or more pages within a plane.

Some physical addresses may be used as data is stored at the array using the first FTL, and a remainder of the physical addresses for the first FTL may be evaluated for storage when receiving new data to write to the memory device. In some cases, the received data may include a quantity of data that is greater than an amount of available pages within a plane of the memory device, and therefore the data may not match the available storage associated with the first FTL and may be broken into smaller chunks for writing to the available pages and planes. Accordingly, the smaller data may match a data size or alignment for the second FTL and may be processed using the second FTL instead of the first FTL. In some cases, one or more of the smaller chunks of data may match a size or alignment of available storage for the first FTL and may be processed accordingly, such that a first portion of the data may be processed using the first FTL and a second portion of the data may be processed using the second FTL.

In these and other examples, if the alignment or size of the data matches the available storage associated with the first FTL, the memory device may proceed to 325, for example, because the data may match data mapping techniques for the first FTL based on the size or alignment of the data with respect to the available storage. Similarly, if the alignment or size of the data does not match the available storage associated with the first FTL, the memory device may proceed to 330 and may use the second FTL for storing the data (e.g., or a portion of the data), for example, because the data (e.g., or the portion thereof) may match data mapping techniques for the second FTL based on the size or alignment of the data (e.g., because the second FTL may be configured for data associated with a smaller granularity).

At 325, the data (e.g., or a portion thereof) may be processed or stored if the data (e.g., or portion thereof) matches the first FTL in size, alignment, or for available storage, for example, based on the determinations at 310, 315, and 320 (e.g., the memory device may determine that the data matches the first FTL based on the determinations at 310, 315, and 320). It is to be understood that the order of determinations at 310, 315, and 320 is not limited by the examples described herein, and that the techniques described with respect to 310, 315, and 320 may be performed in different orders or at different times without departing from the scope of the present disclosure.

At 330, the data (e.g., or a portion thereof) may be processed or stored if the data (e.g., or portion thereof) matches the second FTL in size, alignment, or for available storage, for example, based on the determinations at one of 310, 315, or 320. For example, the memory device may determine that the data matches the second FTL based on determining that a characteristic of the data does not match the first FTL at any of 310, 315, or 320.

Aspects of the flow diagram 300 may be implemented by a controller, among other components. Additionally or alternatively, aspects of the flow diagram 300 may be implemented as instructions stored in memory (e.g., firmware stored in a memory coupled with a memory device or a controller thereof). For example, the instructions, when executed by a controller (e.g., the memory device controller), may cause the controller to perform the operations of the flow diagram 300.

Figure 4:
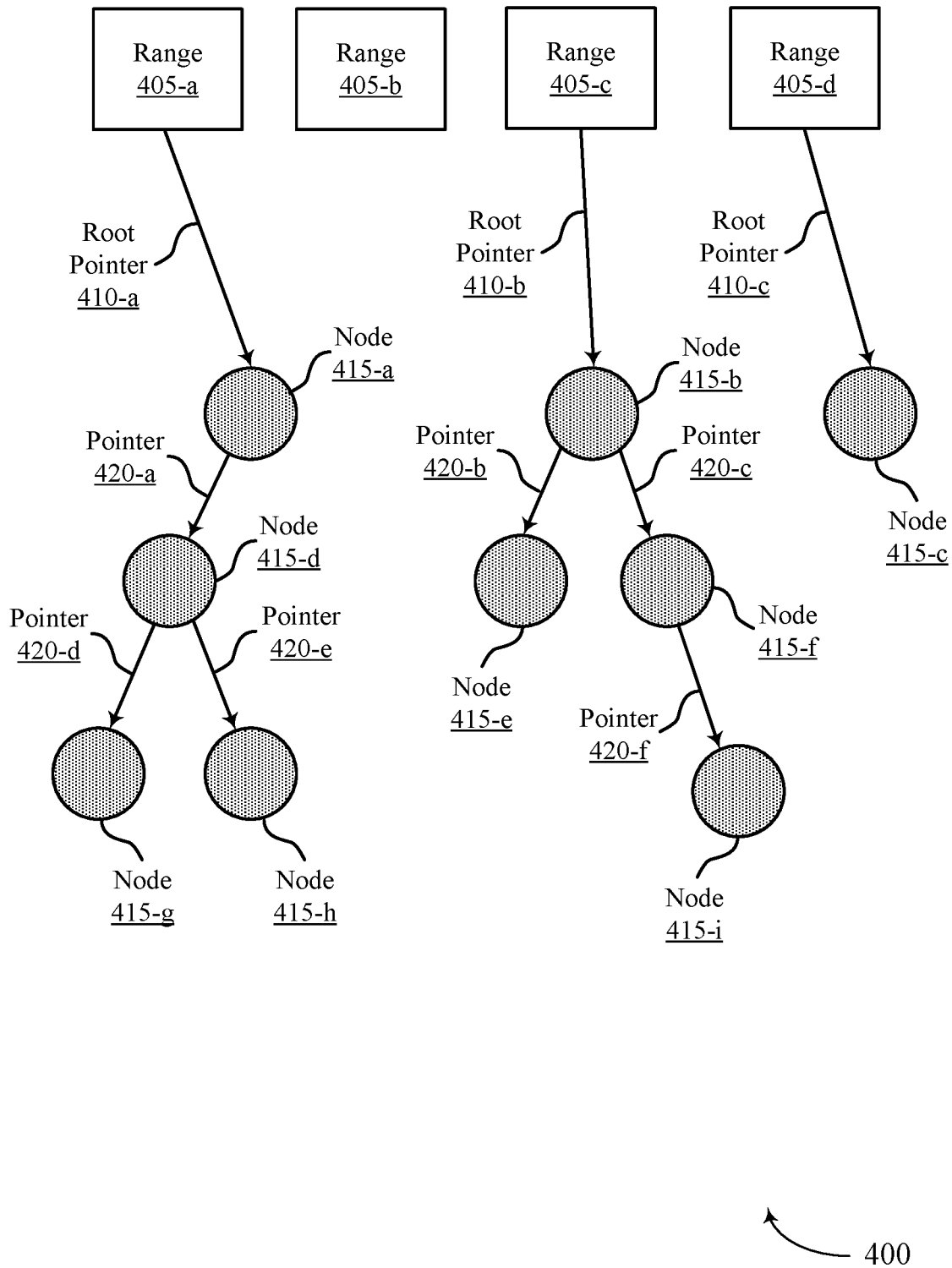
FIG. 4 illustrates an example of a mapping scheme that supports multiple FTLs at a memory device in accordance with examples as disclosed herein.

FIG. 4 illustrates an example of a mapping scheme 400 that supports multiple FTLs at a memory device in accordance with examples as disclosed herein. Mapping scheme 400 may illustrate techniques for a memory device to store and access mapping data for an FTL, for example, as described herein with respect to FIG. 2. The memory device may represent an example of a memory device described with reference to FIGS. 1-3, and the FTL may represent an example of an FTL configured to map data associated with or having a granularity smaller than a defined granularity for another FTL of the memory device.

Mapping scheme 400 may represent an example of a binary tree mapping scheme used for relating logical and physical addresses of data (e.g., used for storing L2P information). The memory device may use a binary tree, for example, because a binary tree may higher flexibility and a smaller address space for a smaller FTL than other mapping schemes. In the examples described herein, mapping scheme 400 may be used for mapping data associated with a memory array have a particular size (e.g., one gigabyte (GB)), but may also apply to mapping data associated with any size of memory array.

In the examples described herein, mapping scheme 400 may be used to map logical addresses of data to physical addresses of data within a memory array having a size of one GB. Upon initialization of the FTL (e.g., when initializing the memory device, such as after a power cycle), the memory array may partition an address space (e.g., logical address space) for a host system or a host device (e.g., or other source external to the memory device) into four ranges 405 of 256 megabytes (MBs), where each range may be sequential and may include different logical addresses. For example, a range 405-a may include logical addresses corresponding to megabytes numbered from 0 to 255, a range 405-b may include logical addresses corresponding to megabytes numbered from 256 to 511, a range 405-c may include logical addresses corresponding to megabytes numbered from 512 to 767, and a range 405-d may include logical addresses corresponding to megabytes numbered from 768 to 1023. Each range 405 may be associated with its own set of nodes of the binary tree that correspond to logical addresses within the respective range 405, and any address (e.g., physical address) within the ranges 405 may be addressed using two bytes or 16 bits of information.

The memory device may define a node 415 within the binary tree and may assign the node 415 an information structure. The information structure may include a logical address field, a physical address field, a left pointer field, and a right pointer field for each node 415 within the binary tree. Each of the fields may include two bytes or 16 bits of information, such that a node 415 within the binary tree may include eight bytes or 64 bits of information. If 64 kB are used for the L2P mapping (e.g., 64 kB of SRAM), the FTL may store information for 8,192 nodes 415 for the binary tree in this manner. Similar structures with different node sizes, node structures, or memory structures, or structures stored using different amounts of memory, may also be implemented without departing from the scope of the present disclosure.

If the memory device receives a write command from the host system or the host device (e.g., or other source external to the memory device) to write data, the memory device (e.g., a controller of the memory device) may select between using the FTL and the other FTL for storing and mapping the data (e.g., as described with reference to FIGS. 2 and 3). If the FTL is selected, the memory device may identify a logical address associated with the data (e.g., as specified in the write command) and may identify the range 405 associated with the logical address and whether any nodes 415 have been defined for the range 405. For example, nodes may be defined if a root pointer 410 points to a first or initial node of the range 405 (e.g., root pointers 410-*a*, 410-*b*, and 410-*c* respectively point to nodes 415-*a*, 415-*b*, and 415-*c*). If nodes 415 have been defined, the memory device may determine if the logical address is included in the defined nodes 415. If the logical address is included in the defined nodes 415, the memory device may update the associated physical address with a new physical address associated with writing the data. If the logical address is not included in the defined nodes 415, the memory device may build or create a new node 415 for the logical address. Similarly, if the range 405 does not include any nodes 415 (e.g., range 405-*b*), the memory device may build or create a new node 415 (e.g., first node in the range 405) for the logical address.

When building or creating information for a node 415, the memory device may include an indication of a logical address, a physical address, a left pointer 420, and a right pointer 420 for the associated node. The logical and physical addresses may respectively represent the logical and physical addresses of the data associated with the node 415 (e.g., for L2P mapping). The left and right pointers 420 may each point to a respective child node 415 for a node 415. For example, a left pointer 420 may point to a child node 415 added to the binary tree after the node 415 and having a logical address that is before the logical address of the node 415, and a right pointer 420 may point to a child node 415 added to the binary tree after the node 415 and having a logical address that is after the logical address of the node 415. In one example, node 415-*b* may include information indicating a left pointer 420-*b* pointing to child node 415-*e* and a right pointer 420-*c* pointing to child node 415-*f*. Accordingly, a logical address for node 415-*b* (e.g., a fifth LBA within range 405-*c*) may be after a logical address for node 415-*e* (e.g., a first LBA within range 405-*c*) but before a logical address for node 415-*f* (e.g., a tenth LBA within range 405-*c*).

When a node 415 is created or initialized, there may be no child nodes 415 for the node 415, and the left and right pointers 420 may be null or empty until a respective child node 415 is added to the binary tree. For example, a right pointer 420 for node 415-*a* may be null or empty, as well as the left and right pointers 420 for node 415-*c*. Similarly, a root pointer 410 may be null or empty for a range 405 until a first or initial node is added to the range 405. For example, a root pointer 410 for range 405-*b* may be null or empty.

The binary tree structure as described herein may be used to look up or read data written to the memory device (e.g., data written using the FTL). For example, as described with reference to FIG. 2, the memory device may determine, for a read command, whether data for the read command is associated with the FTL or with the other FTL, or with both. This process may be performed, for example, by identifying, for each logical address indicated by the read command, the range 405 associated with the logical address. The memory device may perform a binary search on the associated nodes 415 to determine if the logical address is associated with the FTL (e.g., if the logical address is included in the binary tree). If the logical address is found in a node 415 of the binary tree, the memory device may access the associated physical address from the information associated with the node 415 and may access the physical address to perform the read command. If the logical address is not found in a node 415 of the binary tree, the memory device may use a look-up mechanism associated with the other FTL (e.g., to search the primary L2P table).

The binary tree structure may also be flushed, or may have associated data rewritten to data locations associated with the other FTL (e.g., as a part of garbage collecting). When performing a flush, the memory device (e.g., a controller of the memory device) may perform an in-order traversal of each set of nodes 415 (e.g., for each range 405) and may use the mapping information accessed therein to fill out the mapping information for the other FTL (e.g., larger granularity FTL), such as for a read and re-write operation using the other FTL. Any nodes 415 having the associated data rewritten (e.g., all nodes 415) to storage locations associated with the other FTL may be deconstructed (e.g., erased), such that the associated memory (e.g., SRAM memory) may be freed. In some cases, the memory device (e.g., a controller of the memory device) may use a bitmap indicating free or allocated nodes 415 (e.g., the bitmap managed by hardware or firmware), which may be used to identify free or empty nodes 415. In some cases, each node 415 may be used one time before flushing (e.g., garbage collecting), which may simplify the operations associated with the binary tree by removing an allocation or de-allocation function to search for free or empty nodes 415.

In some cases, the binary tree may be stored in controller memory (e.g., SRAM) and may operate using 256 kB or less of the controller memory (e.g., having nodes 415 associated with eight bytes of memory and having 512 MB of available physical space for data storage). Smaller amounts of controller memory may be used for the binary tree, for example, if storage areas associated with the FTL are reduced and a foreground garbage collection is used to clear data from the storage areas associated with the FTL when the storage areas associated with the FTL are at or almost at capacity.

If the binary tree is not flushed before the memory device powers down or performs a power cycle, the binary tree information may be stored in non-volatile memory of the memory device (e.g., as a part of the power down procedure). The information may be scanned or read on power up of the memory device (e.g., as part of power on recovery after power loss) and the binary tree may be rebuilt (e.g., for each range 405). For example, the binary tree information may be re-stored in a corresponding location of the SRAM, as before power down. In some cases, a data block may be used when the binary tree is flushed to indicated that the information in the binary tree and the associated data stored at the memory device has been invalidated.

Figure 5:
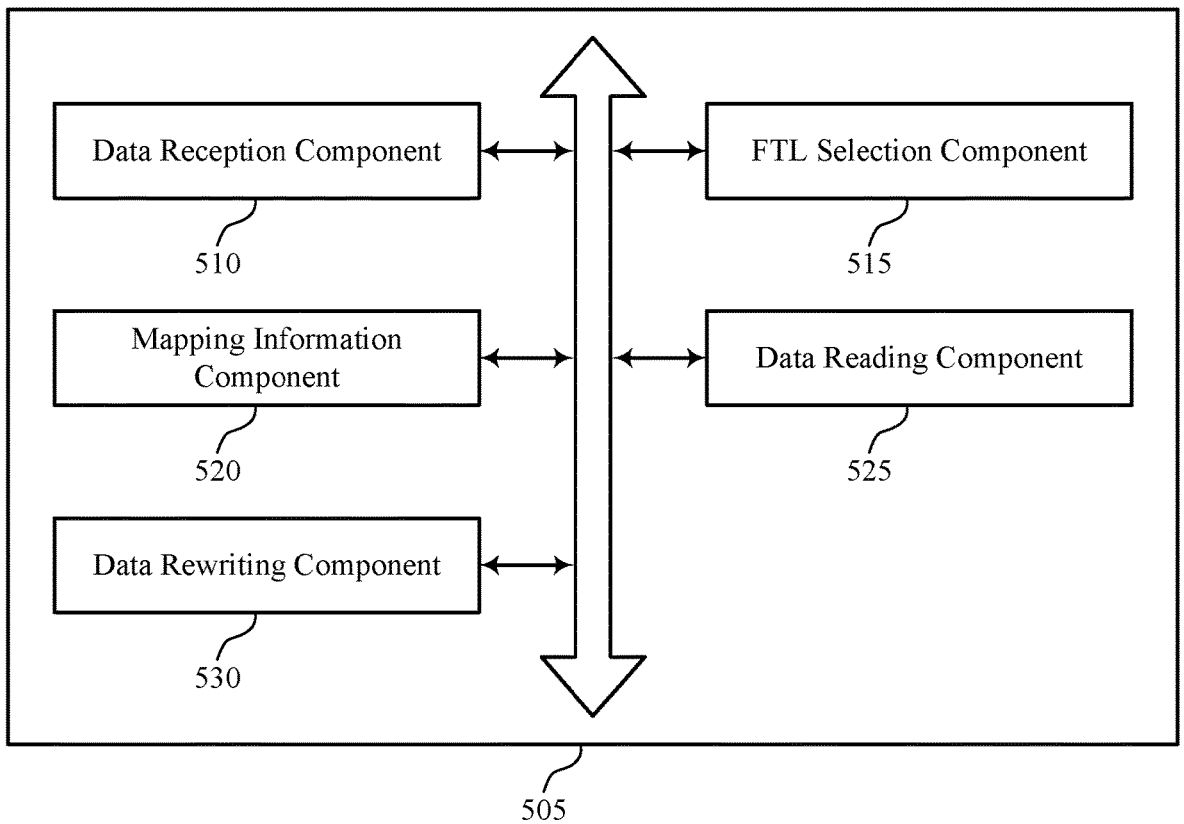
FIG. 5 shows a block diagram of a memory device that supports multiple FTLs at a memory device in accordance with examples as disclosed herein.

FIG. 5 shows a block diagram 500 of a memory device 505 that supports multiple FTLs at a memory device in accordance with examples as disclosed herein. The memory device 505 may be an example of aspects of a memory device as described with reference to FIGS. 1-4. The memory device 505 may include a data reception component 510, an FTL selection component 515, a mapping information component 520, a data reading component 525, and a data rewriting component 530. Each of these modules may communicate, directly or indirectly, with one another (e.g., via one or more buses).

The data reception component 510 may receive, at the memory device, data and a command to store the data at the memory device. In some cases, the command includes an indication of a logical address for the data.

The FTL selection component 515 may select, based on a structure of the data, an FTL for storing the data, the FTL selected between a first FTL and a second FTL that is associated with a smaller size of data storage than the first FTL. In some examples, the FTL selection component 515 may determine that a size of the data is smaller than a threshold size of data storage associated with the first FTL, where the structure of the data includes the size of the data.

In some examples, the FTL selection component 515 may determine that an alignment of one or more subsets of the data fails to match a data alignment associated with the first FTL, where the structure of the data includes the alignment of the one or more subsets. In some examples, the FTL selection component 515 may determine that a size or an alignment of the data fails to match a size or an alignment of one or more storage locations associated with the first FTL, where the structure of the data includes the size or the alignment of the data.

The mapping information component 520 may store, based on selecting the second FTL, mapping information associated with the data at a subset of storage locations of the second FTL, the mapping information having a format corresponding to the second FTL. In some cases, the mapping information includes an L2P address mapping, the L2P address mapping including a flat list, a hash table, a binary tree, or any combination thereof. In some cases, the binary tree includes an indication of one or more child nodes for each L2P address mapping.

The data reading component 525 may receive a second command to read second data stored at the memory device. In some examples, the data reading component 525 may determine, based on receiving the second command, whether the second data is stored using mapping information from the second FTL. In some examples, the data reading component 525 may read the second data based on determining whether the second data is stored using mapping information from the second FTL. In some examples, the data reading component 525 may determine that the second data is stored using second mapping information from the second FTL.

In some examples, the data reading component 525 may read the second data using the second mapping information from the second FTL based on determining that the second data is stored using second mapping information from the second FTL. In some examples, the data reading component 525 may determine that the second data is not associated with mapping information from the second FTL. In some examples, the data reading component 525 may read the second data using second mapping information from the first FTL based on determining that the second data is not associated with mapping information from the second FTL.

The data rewriting component 530 may determine that a condition is met for rewriting the data at the memory device. In some examples, the data rewriting component 530 may select, based on determining that the condition is met, the first FTL for rewriting the data. In some examples, the data rewriting component 530 may store, based on selecting the first FTL, second mapping information associated with the data at a subset of storage locations of the first FTL, the mapping information having a format corresponding to the first FTL. In some cases, the condition includes a power cycle change for the memory device, a quantity of entries of mapping information for the second FTL, an expiration of a timer, or any combination thereof.

Figure 6:
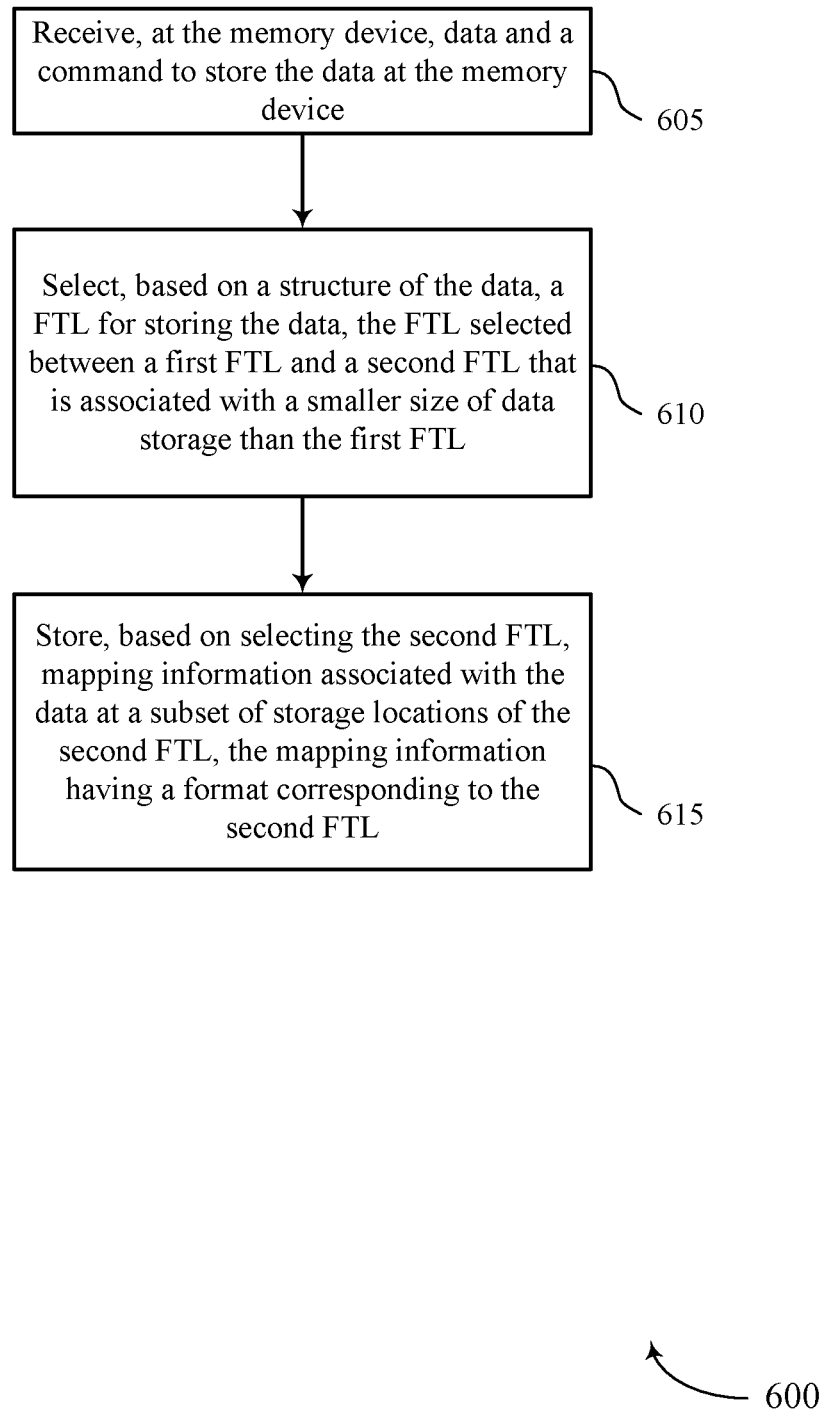
FIG. 6 shows a flowchart illustrating a method or methods that support multiple FTLs at a memory device in accordance with examples as disclosed herein.

FIG. 6 shows a flowchart illustrating a method or methods 600 that supports multiple FTLs at a memory device in accordance with examples as disclosed herein. The operations of method 600 may be implemented by a memory device or its components as described herein. For example, the operations of method 600 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

Aspects of the method or methods 600 may be implemented by a controller, among other components. Additionally or alternatively, aspects of the method or methods 600 may be implemented as instructions stored in memory (e.g., firmware stored in a memory coupled with a memory device). For example, the instructions, when executed by a controller (e.g., the memory controller), may cause the controller to perform the operations of the method or methods 600.

At 605, the memory device may receive, at the memory device, data and a command to store the data at the memory device. The operations of 605 may be performed according to the methods described herein. In some examples, aspects of the operations of 605 may be performed by a data reception component as described with reference to FIG. 5.

At 610, the memory device may select, based on a structure of the data, an FTL for storing the data, the FTL selected between a first FTL and a second FTL that is associated with a smaller size of data storage than the first FTL. The operations of 610 may be performed according to the methods described herein. In some examples, aspects of the operations of 610 may be performed by an FTL selection component as described with reference to FIG. 5.

At 615, the memory device may store, based on selecting the second FTL, mapping information associated with the data at a subset of storage locations of the second FTL, the mapping information having a format corresponding to the second FTL. The operations of 615 may be performed according to the methods described herein. In some examples, aspects of the operations of 615 may be performed by a mapping information component as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for receiving, at the memory device, data and a command to store the data at the memory device, selecting, based on a structure of the data, an FTL for storing the data, the FTL selected between a first FTL and a second FTL that is associated with a smaller size of data storage than the first FTL, and storing, based on selecting the second FTL, mapping information associated with the data at a subset of storage locations of the second FTL, the mapping information having a format corresponding to the second FTL.

In some examples of the method 600 and the apparatus described herein, selecting the FTL may include operations, features, means, or instructions for determining that a size of the data may be smaller than a threshold size of data storage associated with the first FTL, where the structure of the data includes the size of the data. In some examples of the method 600 and the apparatus described herein, selecting the FTL may include operations, features, means, or instructions for determining that an alignment of one or more subsets of the data fails to match a data alignment associated with the first FTL, where the structure of the data includes the alignment of the one or more subsets. In some examples of the method 600 and the apparatus described herein, selecting the FTL may include operations, features, means, or instructions for determining that a size or an alignment of the data fails to match a size or an alignment of one or more storage locations associated with the first FTL, where the structure of the data includes the size or the alignment of the data.

Some examples of the method 600 and the apparatus described herein may further include operations, features, means, or instructions for receiving a second command to read second data stored at the memory device, determining, based on receiving the second command, whether the second data may be stored using mapping information from the second FTL, and reading the second data based on determining whether the second data may be stored using mapping information from the second FTL.

Some examples of the method 600 and the apparatus described herein may further include operations, features, means, or instructions for determining that the second data may be stored using second mapping information from the second FTL, and reading the second data using the second mapping information from the second FTL based on determining that the second data may be stored using second mapping information from the second FTL. Some examples of the method 600 and the apparatus described herein may further include operations, features, means, or instructions for determining that the second data may be not associated with mapping information from the second FTL, and reading the second data using second mapping information from the first FTL based on determining that the second data may be not associated with mapping information from the second FTL.

Some examples of the method 600 and the apparatus described herein may further include operations, features, means, or instructions for determining that a condition may be met for rewriting the data at the memory device, selecting, based on determining that the condition may be met, the first FTL for rewriting the data, and storing, based on selecting the first FTL, second mapping information associated with the data at a subset of storage locations of the first FTL, the mapping information having a format corresponding to the first FTL. In some examples of the method 600 and the apparatus described herein, the condition includes a power cycle change for the memory device, a quantity of entries of mapping information for the second FTL, an expiration of a timer, or any combination thereof.

In some examples of the method 600 and the apparatus described herein, the mapping information includes an L2P address mapping, the L2P address mapping including a flat list, a hash table, a binary tree, or any combination thereof. In some examples of the method 600 and the apparatus described herein, the binary tree includes an indication of one or more child nodes for each L2P address mapping. In some examples of the method 600 and the apparatus described herein, the command includes an indication of a logical address for the data.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory array and a controller coupled with the memory array and configured to cause the apparatus to receive data and a command to store the data at the apparatus, select, based on a structure of the data, an FTL for storing the data, the FTL selected between a first FTL and a second FTL that is associated with a smaller size of data storage than the first FTL, and store, based on selecting the second FTL, mapping information associated with the data at a subset of storage locations of the second FTL, the mapping information having a format corresponding to the second FTL.

Some examples may further include determining that a size of the data may be smaller than a threshold size of data storage associated with the first FTL, where the structure of the data includes the size of the data. Some examples may further include determining that an alignment of one or more subsets of the data fails to match a data alignment associated with the first FTL, where the structure of the data includes the alignment of the one or more subsets. Some examples may further include determining that a size or an alignment of the data fails to match a size or an alignment of one or more storage locations associated with the first FTL, where the structure of the data includes the size or the alignment of the data.

Some examples may further include receiving a second command to read second data stored at the apparatus, determine, based on receiving the second command, whether the second data may be stored using mapping information from the second FTL, and read the second data based on determining whether the second data may be stored using mapping information from the second FTL. Some examples may further include determining that the second data may be stored using second mapping information from the second FTL, and read the second data using the second mapping information from the second FTL based on determining that the second data may be stored using second mapping information from the second FTL. Some examples may further include determining that the second data may be not associated with mapping information from the second FTL, and read the second data using second mapping information from the first FTL based on determining that the second data may be not associated with mapping information from the second FTL.

Some examples may further include determining that a condition may be met for rewriting the data at the apparatus, select, based on determining that the condition may be met, the first FTL for rewriting the data, and store, based on selecting the first FTL, second mapping information associated with the data at a subset of storage locations of the first FTL, the mapping information having a format corresponding to the first FTL. In some examples, the condition includes a power cycle change for the apparatus, a quantity of entries of mapping information for the second FTL, an expiration of a timer, or any combination thereof.

In some examples, the mapping information includes an L2P address mapping, the L2P address mapping including a flat list, a hash table, a binary tree, or any combination thereof. In some examples, the binary tree includes an indication of one or more child nodes for each L2P address mapping. In some examples, the command includes an indication of a logical address for the data.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method performed by a memory device, the method comprising:
    receiving, at the memory device, data and a command to store the data at the memory device;
    selecting, based at least in part on a structure of the data comprising an alignment of the data, a flash translation layer for storing the data, the flash translation layer selected between a first flash translation layer for managing, at least in part, data storage and a first logical to physical (L2P) mapping table and a second flash translation layer for managing, at least in part, a second L2P mapping table and a smaller size of data storage than the first flash translation layer;
    determining that a size and the alignment of the data fails to match a size and an alignment of one or more storage locations associated with the first flash translation layer; and
    storing, based at least in part on selecting the second flash translation layer, mapping information associated with the data at a subset of storage locations of the second flash translation layer, the mapping information having a format corresponding to the second flash translation layer.

2. An apparatus, comprising:
    a memory array;
    a first flash translation layer for managing, at least in part, data storage and a first logical to physical (L2P) mapping table;
    a second flash translation layer for managing, at least in part, a second L2P mapping table and a smaller size of data storage than the first flash translation layer; and
    a controller coupled with the memory array and configured to cause the apparatus to:
        receive data and a command to store the data at the apparatus;
        select, based at least in part on a structure of the data comprising an alignment of the data, a flash translation layer for storing the data, the flash translation layer selected between the first flash translation layer and the second flash translation layer;
        determine that a size and the alignment of the data fails to match a size and an alignment of one or more storage locations associated with the first flash translation layer; and
        store, based at least in part on selecting the second flash translation layer, mapping information associated with the data at a subset of storage locations of the second flash translation layer, the mapping information having a format corresponding to the second flash translation layer.

3. The apparatus of claim 2, wherein the controller is further configured to cause the apparatus to:
    determine that a size of the data is smaller than a threshold size of data storage associated with the first flash translation layer, wherein the structure of the data comprises the size of the data.

4. The apparatus of claim 2, wherein the controller is further configured to cause the apparatus to:
    determine that an alignment of one or more subsets of the data fails to match a data alignment associated with the first flash translation layer, wherein the structure of the data comprises the alignment of the one or more subsets.

5. The apparatus of claim 2, wherein the controller is further configured to cause the apparatus to:
receive a second command to read second data stored at the apparatus;
determine, based at least in part on receiving the second command, whether the second data is stored using mapping information from the second flash translation layer; and
read the second data based at least in part on determining whether the second data is stored using mapping information from the second flash translation layer.

6. The apparatus of claim 5, wherein the controller is further configured to cause the apparatus to:
determine that the second data is stored using second mapping information from the second flash translation layer; and
read the second data using the second mapping information from the second flash translation layer based at least in part on determining that the second data is stored using second mapping information from the second flash translation layer.

7. The apparatus of claim 5, wherein the controller is further configured to cause the apparatus to:
determine that the second data is not associated with mapping information from the second flash translation layer; and
read the second data using second mapping information from the first flash translation layer based at least in part on determining that the second data is not associated with mapping information from the second flash translation layer.

8. The apparatus of claim 2, wherein the controller is further configured to cause the apparatus to:
determine that a condition is met for rewriting the data at the apparatus;
select, based at least in part on determining that the condition is met, the first flash translation layer for rewriting the data; and
store, based at least in part on selecting the first flash translation layer, second mapping information associated with the data at a subset of storage locations of the first flash translation layer, the mapping information having a format corresponding to the first flash translation layer.

9. The apparatus of claim 8, wherein the condition comprises a power cycle change for the apparatus, a quantity of entries of mapping information for the second flash translation layer, an expiration of a timer, or any combination thereof.

10. The apparatus of claim 2, wherein the mapping information comprises a logical to physical address mapping, the logical to physical address mapping comprising a flat list, a hash table, a binary tree, or any combination thereof.

11. The apparatus of claim 10, wherein the binary tree comprises an indication of one or more child nodes for each logical to physical address mapping.

12. The apparatus of claim 2, wherein the command comprises an indication of a logical address for the data.

13. A non-transitory computer-readable medium storing code comprising instructions which, when executed by a processor of an electronic device, cause the electronic device to:
receive data and a command to store the data at the electronic device;
select, based at least in part on a structure of the data comprising an alignment of the data, a flash translation layer for storing the data, the flash translation layer selected between a first flash translation layer for managing, at least in part, data storage and a first logical to physical (L2P) mapping table and a second flash translation layer for managing, at least in part, a second L2P mapping table and a smaller size of data storage than the first flash translation layer;
determine that a size and the alignment of the data fails to match a size and an alignment of one or more storage locations associated with the first flash translation layer; and
store, based at least in part on selecting the second flash translation layer, mapping information associated with the data at a subset of storage locations of the second flash translation layer, the mapping information having a format corresponding to the second flash translation layer.

14. The non-transitory computer-readable medium of claim 13, wherein the instructions, when executed by the processor of the electronic device, further cause the electronic device to:
determine that a size of the data is smaller than a threshold size of data storage associated with the first flash translation layer, wherein the structure of the data comprises the size of the data.

15. The non-transitory computer-readable medium of claim 13, wherein the instructions, when executed by the processor of the electronic device, further cause the electronic device to:
determine that an alignment of one or more subsets of the data fails to match a data alignment associated with the first flash translation layer, wherein the structure of the data comprises the alignment of the one or more subsets.

16. The non-transitory computer-readable medium of claim 13, wherein the instructions, when executed by the processor of the electronic device, further cause the electronic device to:
receive a second command to read second data stored at the electronic device;
determine, based at least in part on receiving the second command, whether the second data is stored using mapping information from the second flash translation layer; and
read the second data based at least in part on determining whether the second data is stored using mapping information from the second flash translation layer.

17. The non-transitory computer-readable medium of claim 16, wherein the instructions, when executed by the processor of the electronic device, further cause the electronic device to:
determine that the second data is stored using second mapping information from the second flash translation layer; and
read the second data using the second mapping information from the second flash translation layer based at least in part on determining that the second data is stored using second mapping information from the second flash translation layer.

18. The non-transitory computer-readable medium of claim 16, wherein the instructions, when executed by the processor of the electronic device, further cause the electronic device to:
determine that the second data is not associated with mapping information from the second flash translation layer; and read the second data using second mapping information from the first flash translation layer based at least in part on determining that the second data is not associated with mapping information from the second flash translation layer.

* * * * *